(12) United States Patent
Ringger et al.

(10) Patent No.: US 7,703,570 B2
(45) Date of Patent: Apr. 27, 2010

(54) STEERING WHEEL MOUNTING FOR TRANSMISSION SHIFT CONTROLS

(75) Inventors: Kurt A. Ringger, Bluffton, IN (US); Matthew W. Hormann, Fort Wayne, IN (US); Mark A. Thurber, Fort Wayne, IN (US); Mary Mc. Wesler, New Paris, OH (US); John F. Rotz, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 1151 days.

(21) Appl. No.: 10/960,665

(22) Filed: Oct. 7, 2004

(65) Prior Publication Data

US 2006/0079372 A1    Apr. 13, 2006

(51) Int. Cl.
*B60K 20/06* (2006.01)
(52) U.S. Cl. ............................................. 180/336
(58) Field of Classification Search .............. 180/333, 180/336; 74/473.12
See application file for complete search history.

(56) References Cited

U.S. PATENT DOCUMENTS

| | | | |
|---|---|---|---|
| 4,648,290 A | 3/1987 | Dunkley et al. | |
| 4,850,236 A | 7/1989 | Braun | |
| 5,099,720 A * | 3/1992 | Raue | 477/144 |
| 5,335,743 A * | 8/1994 | Gillbrand et al. | 180/178 |
| 5,816,100 A | 10/1998 | Fowler et al. | |
| 5,865,705 A | 2/1999 | Shamoto et al. | |
| 5,949,149 A * | 9/1999 | Shitanaka et al. | 307/10.1 |
| 6,053,066 A * | 4/2000 | Ishii et al. | 74/473.18 |
| 6,151,977 A | 11/2000 | Menig et al. | |
| 6,626,062 B1 * | 9/2003 | Yoshitake et al. | 74/552 |
| 6,948,399 B2 * | 9/2005 | Yoshikawa et al. | 74/473.12 |
| 6,997,281 B2 * | 2/2006 | Chernoff et al. | 180/333 |
| 2001/0002646 A1 * | 6/2001 | Leng | 200/61.54 |

* cited by examiner

*Primary Examiner*—Paul N Dickson
(74) *Attorney, Agent, or Firm*—Jeffrey P. Calfa; Mark C. Bach

(57) ABSTRACT

A steering wheel (20) that has an axis of turning (64) axis for steering a motor vehicle that has an engine, a drivetrain, a transmission that provides different gear ratios for coupling the engine to the drivetrain, and a transmission controller that in an automatic mode automatically shifts the transmission from one gear ratio to another in response to changing vehicle torque requirements and in a manual mode shifts the transmission from one gear ratio to another in response to manual actuation of a shift command device. A module (36) contains both the shift command device (58, 60) and a mode selection device (62) for selecting between the automatic and manual modes.

18 Claims, 5 Drawing Sheets

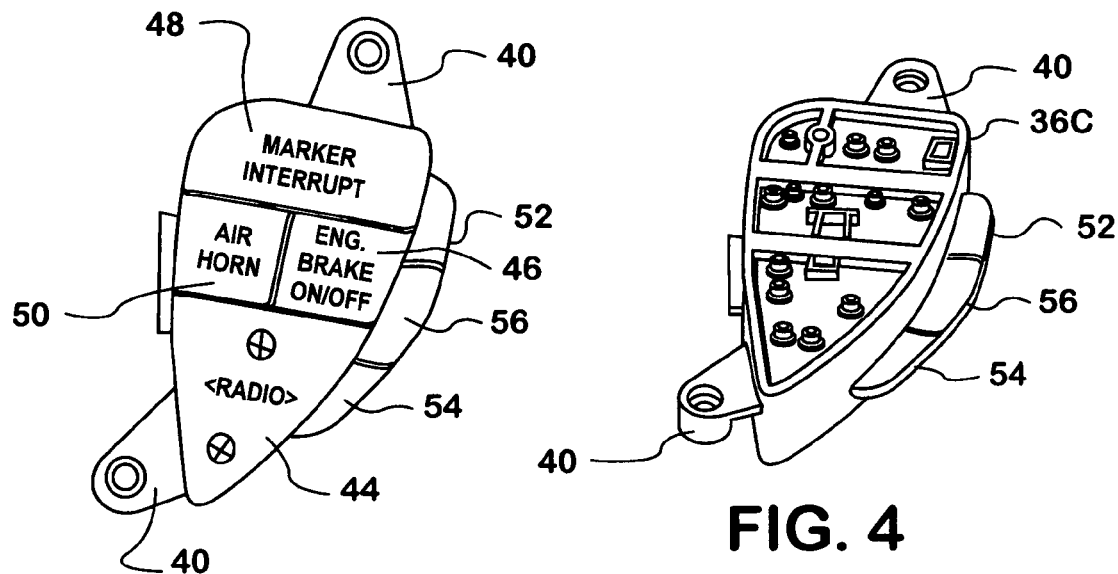
FIG. 3
FIG. 4
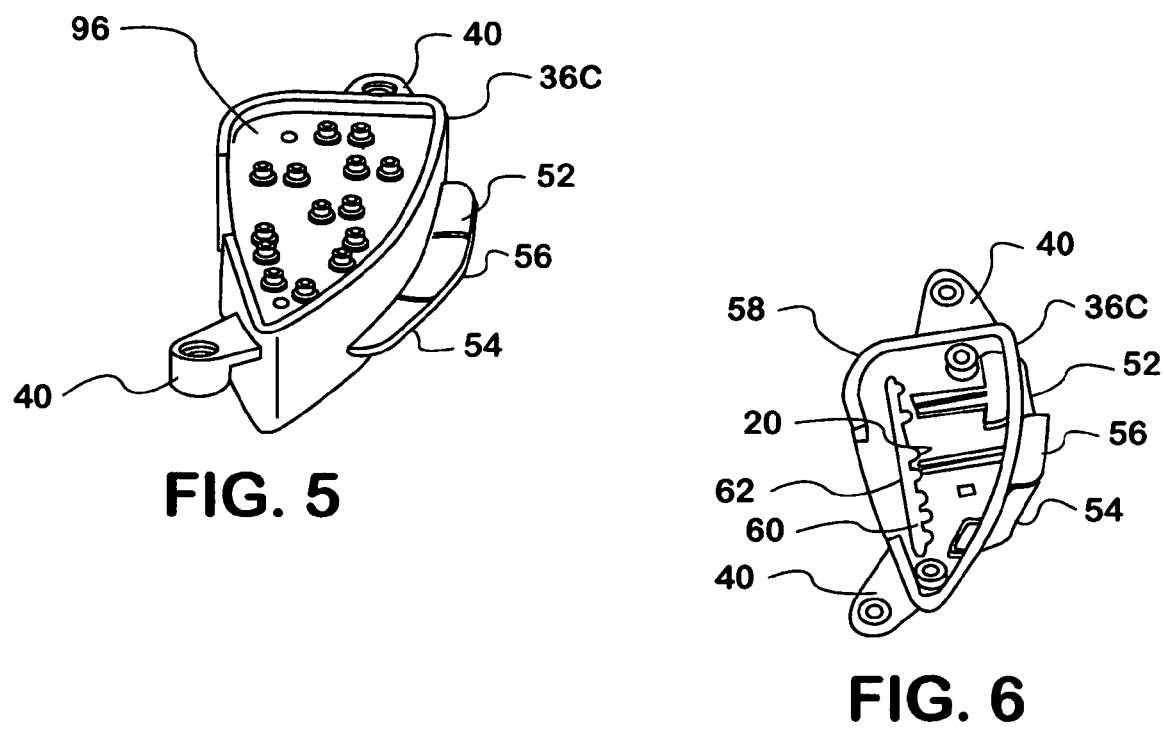
FIG. 5
FIG. 6

STEERING WHEEL MOUNTING FOR TRANSMISSION SHIFT CONTROLS

FIELD OF THE INVENTION

This invention relates generally to motor vehicles whose transmissions are capable of being shifted either manually or automatically, such transmissions including ones that are sometimes referred to as automated manual transmissions. More particularly the invention relates to improvements in certain controls for such transmissions.

BACKGROUND OF THE INVENTION

An automated manual transmission typically comprises an associated controller that processes certain data relevant to control of the transmission and as a result of data processing causes the transmission to be placed in a selected gear ratio through which the vehicle engine delivers torque to the vehicle drivetrain. In an automatic mode of operation, the selected gear ratio may be determined by algorithms that have been programmed into the controller. In a manual mode of operation, gear selection must be made by the driver of the vehicle.

As a vehicle is being driven, certain operating conditions can change, consequently changing values of the data being processed by an automated manual transmission controller. For example, changes that are indicative of changes in vehicle torque requirements may cause the selected gear ratio to change automatically when the transmission is being automatically controlled. In the manual mode, the driver determines the desired gear ratio.

Examples of motor vehicle transmission controls are found in various U.S. patents, including U.S. Pat. Nos. 4,648,290; 4,850,236; 5,816,100; 5,865,705; and 6,151,977. One type of control provides for the driver to select between automatic and manual modes, typically by a mode selection switch. With the manual mode selected, the driver can both upshift and downshift the transmission. Upshifting is performed by actuation of an upshift switch and downshifting by actuation of a downshift switch.

Placement of these controls in relation to driver position in the vehicle, such as in a heavy truck cab, should be made with driver convenience in mind. However, other factors, including various constraints on control placement and the significant number of controls, especially in a heavy truck, are seemingly ever-present when a new vehicle is being designed and developed. One common location for transmission controls is on a console, floor- or dash-mounted, to one side of the vehicle steering wheel. For improving convenience in driver access to transmission controls, it is known to place certain transmission controls on the steering column, as in U.S. Pat. No. 6,151,977, and even on the steering wheel, as in U.S. Pat. No. 5,865,705.

SUMMARY OF THE INVENTION

Based on the observation that certain particular switches involved in transmission control have more frequent driver use than others, the invention provides for a new and unique arrangement for those switches on the vehicle steering wheel.

This allows the driver to issue certain commands to the transmission controller without having to move a hand off the steering wheel to operate a console-mounted control device.

An embodiment of the invention comprises a module, or pod, containing individual control switches at least some of which are the particular transmission control switches having more frequent usage. The module is compact and nests in a zone between spokes that extend from a hub of the steering wheel to a rim. Apertured tabs provide for the fastening of the module to the spokes. Wiring from the switches in the module utilizes conventional devices for connection with remote devices through the steering wheel and steering column.

One generic aspect of the present invention relates to a motor vehicle comprising a steering wheel that can be grasped by a driver who is facing the steering wheel and turned about an axis of turning to steer the vehicle. The vehicle has an engine, a drivetrain, and a transmission that provides different gear ratios for coupling the engine to the drivetrain. A transmission controller functions in a first mode of operation to automatically shift the transmission from one gear ratio to another in response to changing vehicle torque requirements. In a second mode of operation the controller shifts the transmission from one gear ratio to another in response to actuation of a shift command device by a driver of the vehicle.

A mode selection device that selects between the first and second modes and the shift command device are both disposed on the steering wheel in the same semi-circumference of the steering wheel to one side of a diameter of the steering wheel that as viewed by the driver extends between 12 o'clock and 6 o'clock positions when the steering wheel is steering the vehicle in a straight line.

Another generic aspect of the invention relates to a steering wheel that has an axis of turning for steering a motor vehicle that has an engine, a drivetrain, a transmission that provides different gear ratios for coupling the engine to the drivetrain, and a transmission controller that in an automatic mode automatically shifts the transmission from one gear ratio to another in response to changing vehicle torque requirements and in a manual mode shifts the transmission from one gear ratio to another in response to manual actuation of a shift command device. The steering wheel comprises a module that contains both the shift command device and a mode selection device for selecting between the automatic and manual modes.

More specific aspects of the invention relate to specific constructions and arrangements for the mode selection device and the shift command device, both in relation of each to the other and also to additional control devices contained in the module.

The foregoing, along with further features and advantages of the invention, will be seen in the following disclosure of a presently preferred embodiment of the invention depicting the best mode contemplated at this time for carrying out the invention. This specification includes drawings, now briefly described as follows.

BRIEF DESCRIPTION OF THE DRAWINGS

FIG. 3 is a plan view generally in the same direction as FIGS. 1 and 2 showing one of the switch modules on a larger scale.

FIG. 4 is a view similar to FIG. 3, but with portions removed to show more detail.

FIG. 5 is a view similar to FIG. 4, but with more portions removed to show even more detail.

FIG. 6 is a view similar to FIG. 5, but with still more portions removed to show still more detail.

DESCRIPTION OF THE PREFERRED EMBODIMENT

Figure 1:
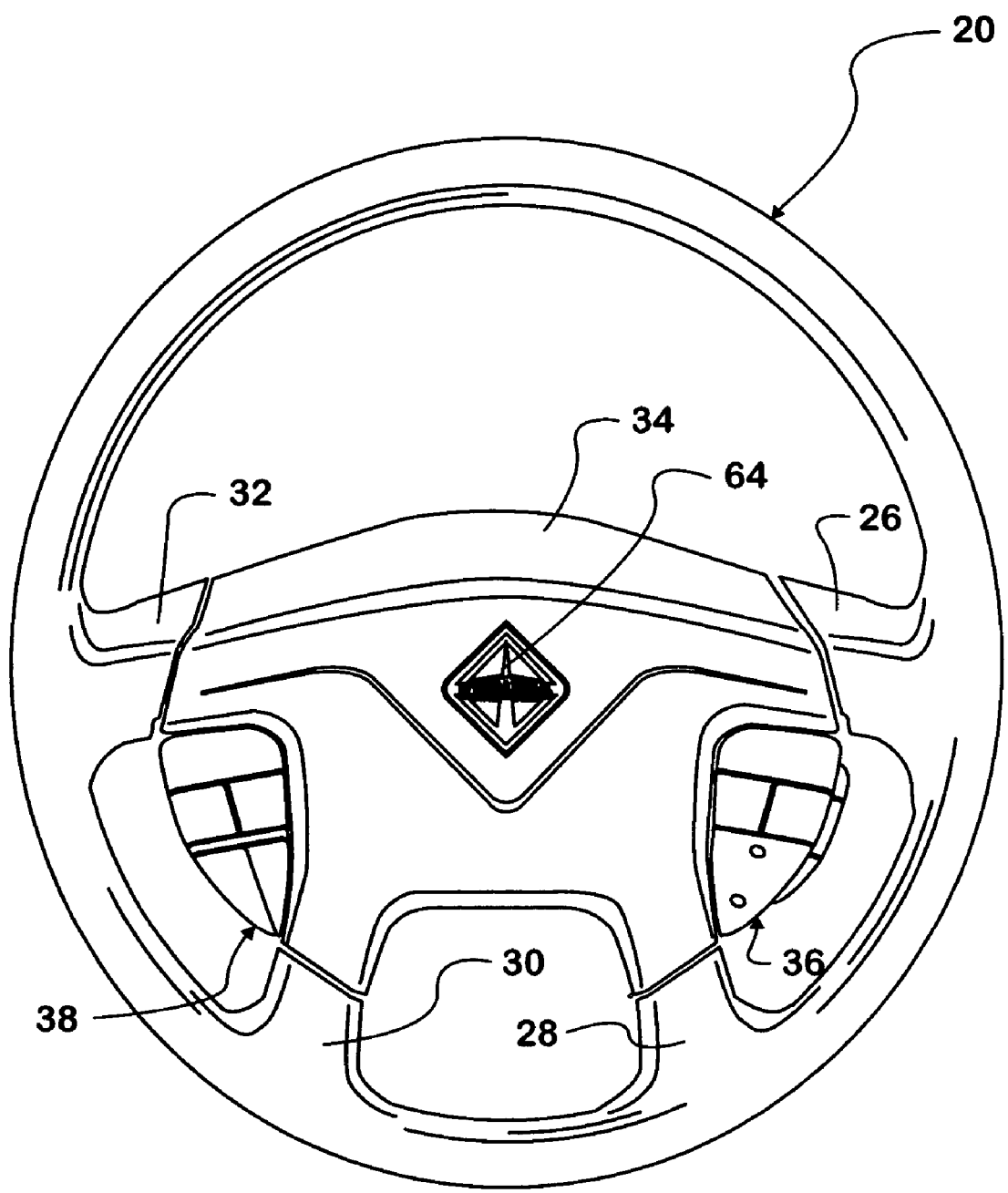
FIG. 1 shows a motor vehicle steering wheel, including switch modules, according to principles of the invention as it would generally appear to the driver of the motor vehicle.
Figure 2:
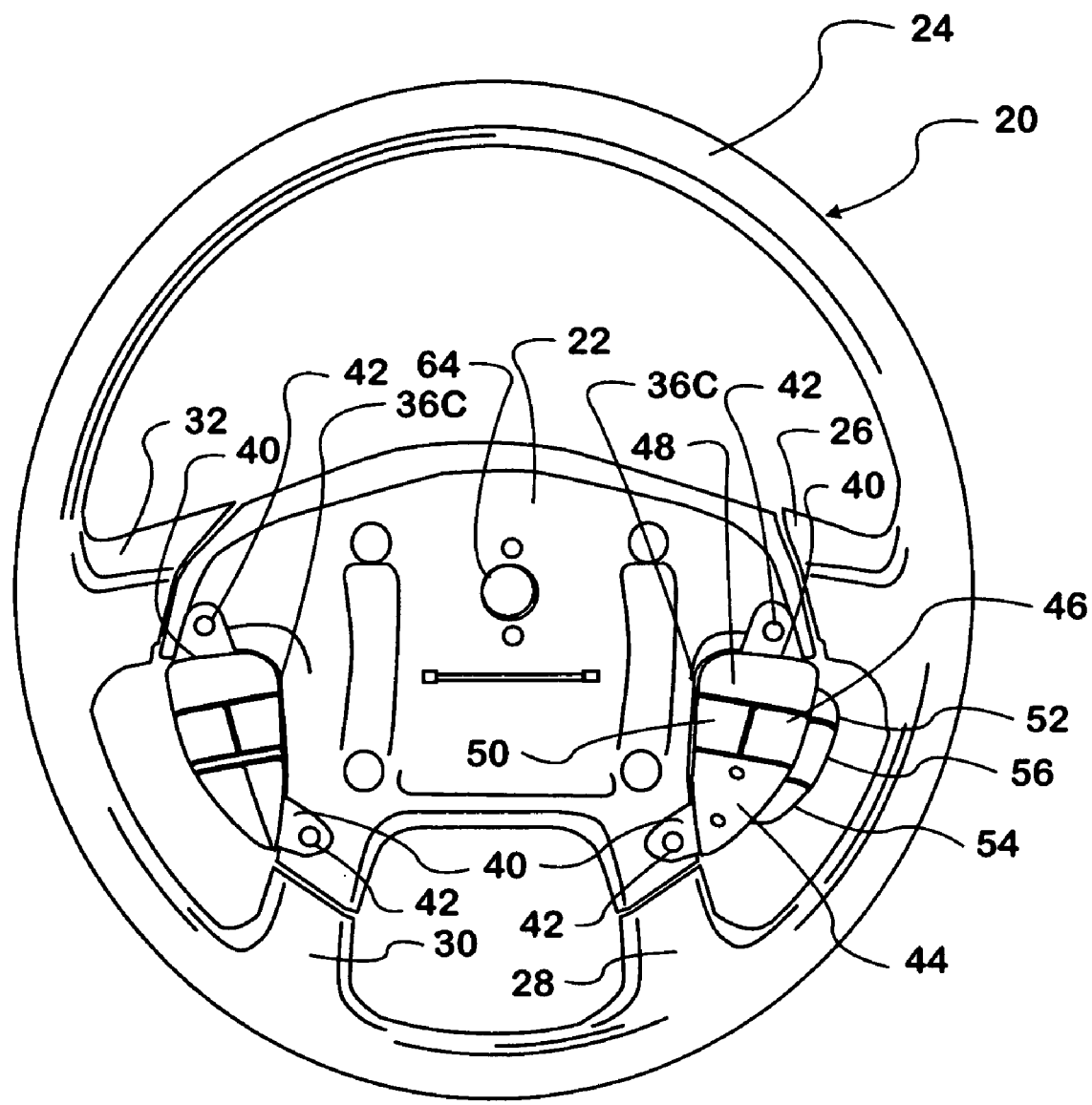
FIG. 2 is a view in the same general direction as FIG. 1, but with a center pad removed.

FIGS. 1 and 2 show a motor vehicle steering wheel 20 that comprises a central hub 22, a circular rim 24, and spokes 26, 28, 30, 32 that join rim 24 to hub 22. A pad 34 that covers hub 22 and adjoining portions of the four spokes in FIG. 1 has been removed in FIG. 2.

Steering wheel 20 includes two switch modules, or pods, 36, 38 shown on right and left sides respectively in both Figures where the position of the steering wheel is the position that a driver of the motor vehicle would see when steering the vehicle in a straight line. Module 36 lies in the right-hand semi-circumference of the steering wheel to one side of a diameter of the steering wheel that as viewed by the driver extends between 12 o'clock and 6 o'clock positions when the steering wheel is steering the vehicle in a straight line. Module 38 lies is the left-hand semi-circumference.

Each module 36, 38 comprises a respective casing 36C, 38C shaped to nest with congruency to the hub and adjoining portions of respective spokes. Apertured tabs 40 at opposite ends of the casings provide for fastening of the modules to the steering wheel by fasteners 42.

Module 36 comprises a number of switches that are operated by depressible actuators. In order to provide such a number of switches in what is a rather compact space, actual current-carrying switch elements are mounted on a circuit board assembly or lamina that fits inside casing 36C. The actuators for the individual switch elements are supported in suitable mountings in the casing that allow for each of them to be depressed to actuate the respective board-mounted switch element.

Some of the actuators for the switches of module 36 are arranged in a zone that faces toward the driver. The particular embodiment of FIGS. 1-3 shows four individual switch actuators 44, 46, 48, 50 forming that zone. The module has three additional switch actuators 52, 54, 56 that are used for controlling certain aspects of the operation of a transmission that provides different gear ratios for coupling an engine of the vehicle to the vehicle's drivetrain. More detail of the switches and switch actuators appears in FIGS. 4-7.

Actuator 52 actuates an upshift command switch 58, actuator 54, a downshift command switch 60, and actuator 56, a mode selection switch 62. Each actuator 52, 54, 56 is depressible in a direction generally toward an axis 64 about which steering wheel 20 turns on a steering column to steer the vehicle.

When a driver desire to actuate any of switches 58, 60, 62, he or she can use the tip of his or her right thumb while the fingers of the same hand remain curled around the portion of rim 24 between spokes 26 and 28. In this way the right hand can still remain on the steering wheel while its thumb is used to push the actuator any of the three switches. Alternatively, the grip of the hand on the rim can be released and a fingertip used to push an actuator.

Although actuators 44, 46, 48, and 50 are radially inward of the more outwardly protruding actuators 52, 54, and 56, it is also possible for one or more of the former four to also be depressed by the right thumb while the fingers remain curled around of rim 24 if the person's thumb is long enough, and alternatively the grip on the rim can be released and a fingertip used to push those actuators.

Depression of a respective actuator 52, 54, 56 is transmitted by a corresponding connection internal to the switch module to actuate the respective electric switch.

Mode selection switch 62 serves to select between a manual operating mode and an automatic operating mode for the transmission. Upshift command switch 58 serves to signal the transmission controller to upshift the transmission, while downshift command switch 60 serves to signal the transmission controller to downshift the transmission. The transmission controller is effective to respond to upshift and downshift commands however only when mode selection switch 62 has switched the transmission controller to operate in the manual mode.

When mode selection switch 62 switches the transmission controller to operate in the automatic mode, the transmission controller automatically shifts the transmission from one gear ratio to another in response to changing vehicle torque requirements, not in response to upshift and downshift commands from switches 58 and 60. Actuation of switch 62 causes the selected mode to switch from the mode that is currently selected to the other mode each time that its actuator 56 is depressed.

As viewed by the driver, actuator 52 is disposed circumferentially counterclockwise of actuator 56, and actuator 54 is disposed circumferentially clockwise of the actuator 56.

Actuator 44 is associated with controls for an audio system in the vehicle such as a radio. It is arranged to be depressed at any of four locations: 12 o'clock, 3 o'clock, 6 o'clock, and 9 o'clock. Depressing each of two opposite locations will increase the volume of the radio speakers and decrease the volume respectively. Depressing each of the other two opposite locations will select a station transmitting at a higher radio frequency and a station transmitting at a lower frequency respectively.

Actuator 48 is associated with a marker interrupt function. Depressing actuator 48 will interrupt the vehicle marker lamps as long as it continues to be depressed.

Actuator 46 is associated with an engine brake function. Depressing actuator 46 will switch the engine brake between being enabled (ON) and unenabled (OFF).

Actuator 50 operates a switch that sounds an air horn.

Figure 8:
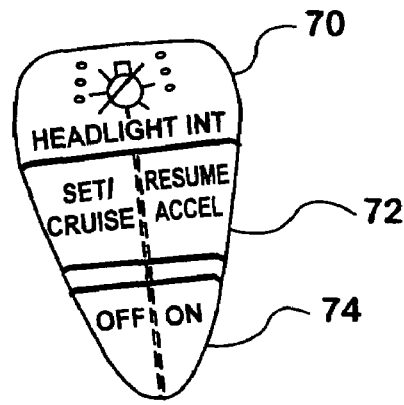
FIG. 8 is a view showing the other switch module in more detail.

Module 38 comprises a number of switches that are operated by depressible actuators. Like module 36, module 38 current-carrying switch elements mounted on a circuit board or lamina that fits inside casing 38C. The actuators for the individual switch elements are supported in suitable mountings in the casing that allow for each of them to be depressed to actuate the respective board-mounted switch element. FIG. 8 shows three actuators 70, 72, 74.

Actuator 70 is associated with a headlight interrupt function. Depressing actuator 70 will interrupt the vehicle head lights as long as it continues to be depressed. Actuators 72 and 74 are associated with a cruise control system of the vehicle. Depressing actuator at opposite side turns cruise control on and off respectively. Actuator 74 controls the usual "set/cruise" and "resume/accelerate" functions.

Figure 9:
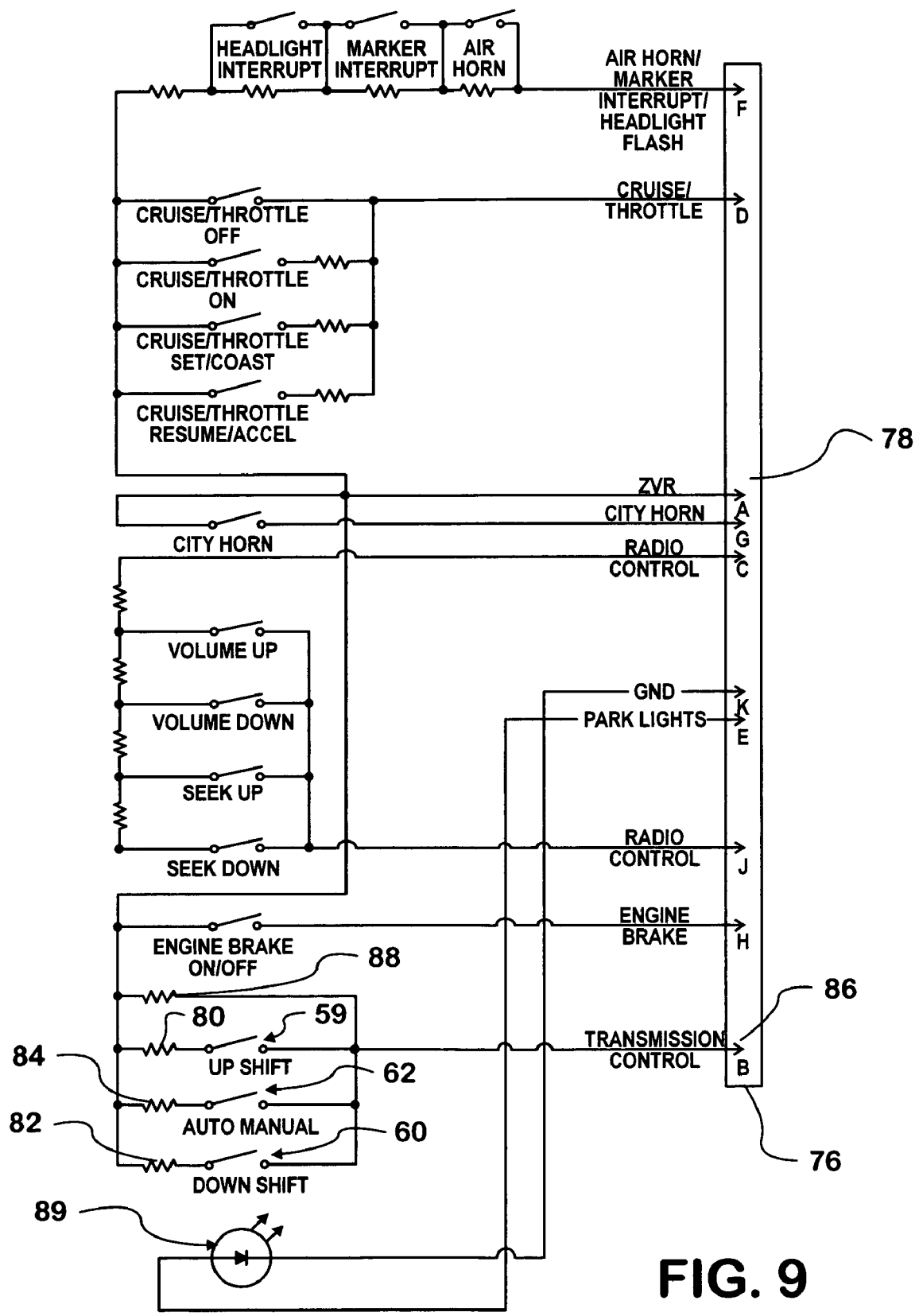
FIG. 9 is an electrical schematic diagram showing circuit connections for switches of the two modules.

FIG. 9 shows a schematic diagram of how the individual switches of the two modules 36, 38 are connected in circuit with the vehicle electrical system through a multi-pin connector 76. A reference voltage is supplied to pin 78 and distributed to various switches and/or resistors as shown. The switches and resistors are contained on the circuit board assemblies within the switch modules. A respective resistor 80, 82, 84 is associated switches 58, 60, 62, each resistor being in series with the respective switch.

The reference voltage at pin 78 is supplied to the resistor of each of these three series circuits. The switches are connected to a pin 86 of connector 76. A resistor 88 shunts the three series circuits. Depending on which switch or switches is or are being actuated, a voltage that is distinctive of the particular actuation condition will be present at pin 86. The transmission control has the capability to interpret the voltage as a signal of which switch or switches is or are being actuated so that it will control the transmission accordingly. The modules also have LED's 89 (light emitting diodes) for night time illumination of indicia identifying various actuators. The LED's are fed from the parking light circuit in the vehicle.

FIG. 6 shows a condition of actuation where actuator 52 is being depressed to actuate switch 58 and neither switch 60 nor switch 62 is being actuated. If switch 62 has set transmission control to manual, depressing actuator 52 to actuate switch 58 will signal the transmission controller to upshift the transmission and cause an upshift. A light (not shown in FIG. 9) illuminates when manual operation for the transmission control has been selected by the driver, allowing the driver to upshift the transmission by depressing actuator 52 and downshift by depressing actuator 54. If switch 62 has instead set transmission control to automatic, depressing either actuator 52 or 54 to actuate switch 58 or switch 60 will still signal the transmission controller to upshift or downshift the transmission, but the transmission controller will not do so because it is in the automatic mode.

Figure 7:
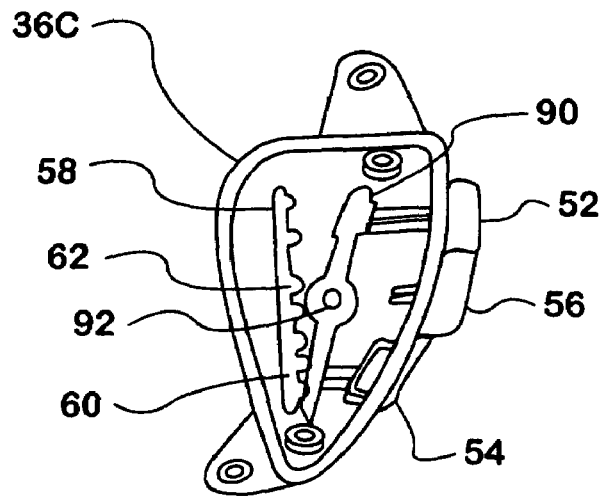
FIG. 7 is the same view as FIG. 6, but showing a different condition of actuation for certain switches.

FIG. 7 shows a condition of actuation where actuator 54 is being depressed to actuate switch 60 and neither switch 58 nor switch 62 is being actuated. If switch 62 has set transmission control to manual, depressing actuator 54 to actuate switch 60 will signal the transmission controller to downshift the transmission and cause a downshift. If switch 62 has instead set transmission control to automatic, depressing actuator 54 to actuate switch 60 will still signal the transmission controller to downshift the transmission, but the transmission controller will not do so because it is in the automatic mode.

Switches 58 and 60 cannot both be actuated at the same time because the connection to their respective actuators is through a rocker arm 90 that is pivoted at 92 on the bottom wall of casing 36C. In other words, depressing one of actuators 52, 54 to actuate the respective switch 58, 60 will pivot rocker arm 90 to push the other actuator away from its switch. When neither actuator 52, 54 is being depressed, rocker arm 90 assumes a neutral intermediate position where both actuators 52, 54 protrude essentially equally from the pod casing. Actuator 56 has no interaction with actuators 52, 54 and can be depressed at anytime without interacting with actuators 52, 54. Likewise, actuation of either actuator 52, 54 does not affect actuator 56.

FIG. 5 shows a portion of a circuit board assembly 96 having protruding domes through which the respective actuators 44, 46, 48, 50 act to operate the respective switches on the circuit board assembly. Switches 58, 60, 62 are on another portion of the circuit board assembly below the portion that is shown in FIG. 5.

While a presently preferred embodiment of the invention has been illustrated and described, it should be appreciated that principles of the invention apply to all embodiments falling within the scope of the following claims.

What is claimed is:

1. A steering wheel that has an axis of turning for steering a motor vehicle that has an engine, a drivetrain, a transmission that provides different gear ratios for coupling the engine to the drivetrain, and a transmission controller that in an automatic mode automatically shifts the transmission from one gear ratio to another in response to changing vehicle torque requirements and in a manual mode shifts the transmission from one gear ratio to another in response to manual actuation of a shift command device, the steering wheel comprising:
a module that contains both the shift command device and a mode selection device for selecting between the automatic and manual modes.

2. A steering wheel as set forth in claim 1 wherein the mode selection device comprises a mode selection switch having a depressible actuator for causing the switch to issue a signal for changing the mode from one mode to the other.

3. A steering wheel as set forth in claim 2 wherein the depressible actuator is arranged to be depressed by the thumb tip of one hand of a driver while the driver's fingers of the same hand remain curled around a portion of a rim of the steering wheel that is radially outward of the depressible actuator relative to the axis of turning of the steering wheel.

4. A steering wheel as set forth in claim 3 wherein the actuator is depressible in a direction generally parallel to the axis of turning of the steering wheel.

5. A steering wheel as set forth in claim 2 wherein the shift command device comprises both an upshift command switch and a downshift command switch.

6. A steering wheel as set forth in claim 5 wherein an actuator for the upshift command switch and an actuator for the downshift command switch are disposed to respective circumferential sides of the mode selection switch actuator.

7. A steering wheel as set forth in claim 6 wherein the actuator for the upshift command switch is disposed circumferentially counterclockwise of the actuator for the mode selection switch as viewed by the driver.

8. A steering wheel as set forth in claim 7 wherein actuators for both the upshift command switch and the downshift command switch are depressible in a direction generally parallel to the axis of turning of the steering wheel, and the depressible actuator of the mode selection switch is also depressible in a direction generally parallel to the axis of turning of the steering wheel.

9. A steering wheel as set forth in claim 1 wherein the module comprises additional control devices each having a respective depressible actuator and collectively occupying a zone from which an actuator for the mode selection switch and an actuator for the shift command device protrude radially further outward relative to the axis of turning of the steering wheel.

10. A steering wheel as set forth in claim 9 wherein the shift command device comprises an upshift command switch and a downshift command switch each having a respective depressible actuator, the mode selection device comprises a mode selection switch having a depressible actuator, and the actuators of the upshift command switch, the downshift command switch, and the mode selection switch are arranged in circumferential succession about the axis of turning of the steering wheel.

11. A steering wheel as set forth in claim 10 wherein the actuator of the upshift command switch is disposed circumferentially counterclockwise of the actuator of the mode selection switch as viewed by the driver, and the actuator of the downshift command switch is disposed circumferentially clockwise of the actuator of the mode selection switch as viewed by the driver.

12. A steering wheel as set forth in claim 11 wherein each of the actuators of the upshift command switch, of the mode selection switch, and of the downshift command switch, and the actuators of at least some of the additional control devices are depressible in a direction generally parallel to the axis of turning of the steering wheel.

13. A steering wheel as set forth in claim 1 wherein the steering wheel comprises a hub, a rim, and spokes joining the rim to the hub, and the module is fastened to circumferentially adjacent spokes.

14. A steering wheel as set forth in claim 13 wherein the module is disposed in a zone of the steering wheel between 3 o'clock and 6 o'clock positions when the steering wheel is in a position that would be steering a vehicle in a straight line.

15. A motor vehicle comprising:
a steering wheel that can be grasped by a driver who is facing the steering wheel and turned about an axis of turning to steer the vehicle,
an engine,
a drivetrain,
a transmission that provides different gear ratios for coupling the engine to the drivetrain, and
a transmission controller that in a first mode automatically shifts the transmission from one gear ratio to another in response to changing vehicle torque requirements and in a second mode shifts the transmission from one gear ratio to another in response to actuation of a shift command device by a driver of the vehicle,
wherein a mode selection device for selecting between the first and second modes and the shift command device are both disposed on the steering wheel in the same semi-circumference of the steering wheel to one side of a diameter of the steering wheel that as viewed by the driver extends between 12 o'clock and 6 o'clock positions when the steering wheel is steering the vehicle in a straight line;
wherein the mode selection device and the shift command device are disposed in a module with each device comprising a respective depressible actuator, and the module comprises additional control devices each having a respective depressible actuator and collectively occupying a zone from which the actuators of the mode selection device and the shift command device protrude radially further outward relative to the axis of turning of the steering wheel.

16. A motor vehicle as set forth in claim 15 wherein the shift command device comprises an upshift command switch and a downshift command switch each of which is actuated by its own respective depressible actuator, the mode selection device comprises a mode selection switch actuated by the actuator of the mode selection device, and the actuators of the upshift command switch, the downshift command switch, and the mode selection device are arranged in circumferential succession about the axis of turning of the steering wheel.

17. A motor vehicle as set forth in claim 16 wherein the actuator of the upshift command switch is disposed circumferentially counterclockwise of the actuator of the mode selection device as viewed by the driver, and the actuator of the downshift command switch is disposed circumferentially clockwise of the actuator of the mode selection device as viewed by the driver.

18. A motor vehicle as set forth in claim 16 wherein each of the actuators of the upshift command switch, of the mode selection device, and of the downshift command switch, and the actuators of at least some of the additional control devices are depressible in a direction generally parallel to the axis of turning of the steering wheel.

* * * * *